(12) United States Patent
Knudsen (10) Patent No.: US 9,683,467 B2
(45) Date of Patent: Jun. 20, 2017

(54) SYSTEM AND METHOD OF COOLING VALVE WITH MATERIAL IN CAVITY

(71) Applicant: General Electric Company, Schenectady, NY (US)

(72) Inventor: Julian Richard Knudsen, North Prairie, WI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 135 days.

(21) Appl. No.: 14/565,827

(22) Filed: Dec. 10, 2014

(65) Prior Publication Data

US 2016/0169062 A1 Jun. 16, 2016

(51) Int. Cl.
*F01L 3/14* (2006.01)
*F01L 3/02* (2006.01)
(Continued)

(52) U.S. Cl.
CPC ........ *F01L 3/14* (2013.01); *F01L 3/02* (2013.01); *F16K 1/36* (2013.01); *F16K 27/02* (2013.01);
(Continued)

(58) Field of Classification Search
CPC . F01L 3/14; F01L 3/02; F01L 2103/00; F16K 49/00; F16K 1/36; F16K 27/02;
(Continued)

(56) References Cited

U.S. PATENT DOCUMENTS

| 1,670,965 A | * | 5/1928 | Heron | F01L 3/14 |
| | | | | 29/888.45 |
| 1,699,273 A | * | 1/1929 | Bissell | F01L 3/02 |
| | | | | 122/DIG. 13 |

(Continued)

FOREIGN PATENT DOCUMENTS

| CN | 202483661 U | 10/2012 |
| CN | 202900355 U | 4/2013 |

(Continued)

OTHER PUBLICATIONS

European Search Report and Opinion issued in connection with corresponding EP Application No. 15196878.1 on May 3, 2016.

*Primary Examiner* — John Bastianelli
(74) *Attorney, Agent, or Firm* — Fletcher Yoder, P.C.

(57) ABSTRACT

A system includes a reciprocating engine, the reciprocating engine includes a poppet valve having a first valve end and a second valve end. The poppet valve includes a valve head having the first valve end. The valve head may open and close a fluid passageway within the reciprocating engine. The poppet valve also includes a stem extending from the valve head and having a first length. The stem has the second valve end and the second valve end is substantially opposite the first valve end. The poppet valve also includes a cavity aligned with a centerline axis of the poppet valve. The cavity includes a first region disposed within the valve head and a second region disposed within the stem, and the second region has a second length that is shorter than the first length. The poppet valve further includes a metal alloy disposed within the cavity. The metal alloy is in a liquid-phase during operation of the reciprocating engine and may transfer heat from the valve head to the stem.

18 Claims, 4 Drawing Sheets

(51) Int. Cl.
*F16K 1/36* (2006.01)
*F16K 27/02* (2006.01)
*F16K 49/00* (2006.01)

(52) U.S. Cl.
CPC ........... *F16K 49/00* (2013.01); *F01L 2103/00* (2013.01); *Y10T 137/0491* (2015.04); *Y10T 137/598* (2015.04); *Y10T 137/6065* (2015.04)

(58) Field of Classification Search
CPC ........... Y10T 137/0491; Y10T 137/598; Y10T 137/6065
USPC ................... 251/368; 123/188.9; 29/888.45; 137/15.18, 315.01, 315.27
See application file for complete search history.

(56) References Cited

U.S. PATENT DOCUMENTS

| | | | | | |
|---|---|---|---|---|---|
| 2,369,063 | A | * | 2/1945 | McDill | F01L 3/02 123/188.3 |
| 2,410,190 | A | * | 10/1946 | Townhill | B23P 13/00 29/888.45 |
| 2,411,734 | A | * | 11/1946 | Kerwin | B21K 1/22 123/188.1 |
| 3,710,773 | A | * | 1/1973 | Piech | F01L 3/02 123/188.3 |
| 3,911,875 | A | | 10/1975 | Ysberg | |
| 3,945,356 | A | | 3/1976 | Kuhn | |
| 4,459,949 | A | * | 7/1984 | Weintz | F01L 3/14 123/188.9 |
| 5,056,219 | A | * | 10/1991 | Iwase | B21K 1/22 123/188.3 |
| 5,458,314 | A | * | 10/1995 | Bonesteel | B21D 22/21 123/188.3 |
| 5,769,037 | A | * | 6/1998 | Ohtsubo | F01L 3/14 123/188.9 |
| 6,006,713 | A | * | 12/1999 | Gebauer | F01L 3/12 123/188.9 |
| 2012/0255175 | A1 | * | 10/2012 | Morii | B21C 23/183 29/888.45 |

FOREIGN PATENT DOCUMENTS

| | | |
|---|---|---|
| GB | 122186 A | 2/1920 |
| WO | 2013145250 A1 | 10/2013 |
| WO | 2014054613 A1 | 4/2014 |

* cited by examiner

SYSTEM AND METHOD OF COOLING VALVE WITH MATERIAL IN CAVITY

BACKGROUND

The subject matter disclosed herein relates to reciprocating engines and, more specifically, to exhaust valves for reciprocating engines.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A reciprocating engine (e.g., an internal combustion engine such as a diesel engine) combusts fuel with an oxidant (e.g., air) in a combustion chamber to generate hot combustion gases, which in turn drive a piston (e.g., reciprocating piston) within a cylinder. In particular, the hot combustion gases expand and exert a pressure against the piston that linearly moves the position of the piston from a top portion to a bottom portion of the cylinder during an expansion stroke. The piston converts the pressure exerted by the hot combustion gases (and the piston's linear motion) into a rotating motion (e.g., via a connecting rod and a crankshaft coupled to the piston) that drives one or more loads, for example, an electrical generator. A cylinder head is generally at a top of the cylinder, above the piston and other components of the cylinder. The cylinder head may include a poppet valve (e.g., an intake and/or exhaust valve). Similar to the piston, the poppet valve reciprocates to allow a flow of fluids (e.g., fuel, air, exhaust gases) in and out of the combustion chamber. For example, during engine operation, the poppet valve may open and close a fluid passage within the cylinder head to control an influx of fuel (and air) into the combustion chamber, and an efflux of exhaust gases out of the combustion chamber.

The poppet valve, in particular the exhaust valve, is exposed to the operational conditions of the combustion chamber such as elevated temperatures and combustion byproducts (e.g., exhaust gases, carbon particulates, etc.). Therefore, the poppet valve may need to be cooled to mitigate thermal stress and overheating.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, valve for a cylinder head of a reciprocating engine includes a first valve end and a second valve end, a valve head having the first valve end, and a stem extending from the valve head and having a first length. The stem has the second valve end and the second valve end is substantially opposite the first valve end. The valve also includes a cavity aligned with a centerline axis of the valve. The cavity includes a first region disposed within the valve head and a second region disposed within the stem, and the second region has a second length that is shorter than the first length. The valve further includes a metal alloy disposed within the cavity. The metal alloy may transfer heat from the valve head to the stem.

In a second embodiment, a valve includes a valve head having a first valve end and a stem extending from the valve head and having a second valve end and including a first length. The second valve end is substantially opposite the first valve end. The valve also includes a cavity aligned with a centerline axis of the valve. The cavity includes a first region disposed within the valve head and a second region disposed within the stem. The first region and the second region form a continuous passage and the second region has a second length shorter than the first length along the centerline. The valve also includes a plurality of protrusions disposed within the second region of the cavity and a metal alloy disposed within a portion of the first region, the second region, or a combination thereof. The metal alloy includes a melting temperature less than 250 degrees Celsius (° C.).

In a third embodiment, a method includes forming a valve base including a first thermally conductive material, a valve head having a first end, a valve stem having a second end. The second end is substantially opposite from the first end. The method also includes forming a cavity within the valve base. The cavity is aligned with a centerline axis of the valve base and the cavity includes a first region disposed within the valve head and a second region disposed within the valve stem, and the first region and the second region are fluidly coupled. The method also includes depositing a second thermally conductive material into at least a portion of the cavity. The second thermally conductive material is different from the first thermally conductive material, and the second thermally conductive material comprises a metal alloy.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure provides embodiments for a system and method of manufacturing fluid cooled poppet valves (e.g., exhaust valve). Poppet valves (e.g., intake and exhaust valves) are used to enable a flow of fluids such as fuel, air, and exhaust gases into and out of a combustion chamber of a reciprocating engine. For example, during operation of the engine, the intake valve reciprocates within a passageway in a cylinder head of the engine to open the passageway and allow fuel and air to enter the combustion chamber, while the exhaust valve is nested within a corresponding valve seat to block the fuel and air from prematurely exiting the combustion chamber. Similarly, after combustion, the exhaust valve lifts from its corresponding valve seat to allow exhaust gases generated during combustion of the fuel to be released, and the intake valve is nested within its corresponding valve seat.

The poppet valves, in particular the exhaust valve, may be exposed to high temperatures from the exhaust gas exiting through the exhaust passageway. For example, the exhaust gas generated from the combustion of the fuel and air may have a temperature between approximately 400° C. (752° F.) and approximately 1100° C. (2732° F.). As the exhaust gas exits through the exhaust passageway, the exhaust valve may undergo thermal stress and/or overheating due to the high heat load on the valve. Sodium metal (e.g., elemental sodium) may be used as a heat transfer agent to reduce a temperature of the exhaust valve by efficiently moving the heat from a valve head up a stem of the exhaust valve, and into a cooler region of the exhaust valve (e.g., a region away from the combustion chamber of the engine). For example, the sodium is disposed within a hollow cavity of the exhaust valve that enables fluid communication between the hot valve head and the cooler region within the stem of the exhaust valve. During reciprocation of the exhaust valve, the sodium moves from a heated region of the exhaust valve (e.g., a region at or near the combustion chamber of the engine) to the cooler region of the exhaust valve, and thereby reduces the heat load of the heated region of the exhaust valve. However, while the sodium effectively mitigates thermal stress and overheating of the exhaust valve, there may be several disadvantages with disposal of sodium-filled exhaust valves. For example, due to certain chemical properties of the sodium metal (e.g., water and/or water vapor sensitivity), disposal of sodium-filled exhaust valves may need to undergo several processing and handling steps to make the sodium metal suitable for disposal. The processing and handling steps may increase the overall disposal cost of the sodium-filled exhaust valves, and thereby increase engine repair costs. Therefore, it may be advantageous to incorporate other cooling materials for the exhaust valves that have cooling properties similar to sodium metal, but have more desirable chemical properties.

Figure 1:
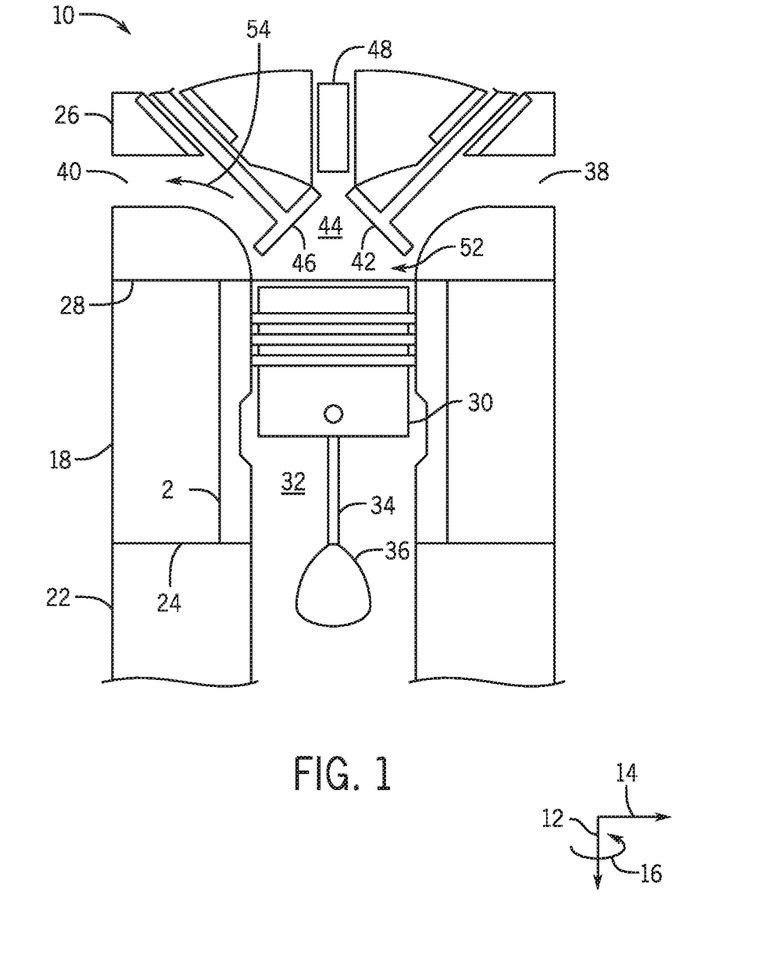
FIG. 1 is a cross-sectional side view of an embodiment of a reciprocating or piston engine.

Turning now to the drawings and referring to FIG. 1, a cross-sectional side view of an embodiment of the reciprocating or piston engine 10 that may use the poppet valve is provided. In the following discussion, reference may be made to longitudinal axis or direction 12, a radial axis or direction 14, and/or a circumferential axis or direction 16 of the engine 10. As mentioned above, in certain embodiments, the engine 10 may include a poppet valve to enable a flow of fluids (e.g., fuel, air, exhaust gases, etc.) in and out of a combustion chamber of the engine (e.g., the engine 10). The engine 10 includes a cylinder 18 having a cylinder liner 20, a crankcase 22 coupled to a bottom end 24 of the liner 20 and the cylinder 18, a cylinder head 26 coupled to a top end 28 of the liner 20 and the cylinder 18, a piston 30 disposed in a cavity 32 within the liner 20, and a connecting rod 34 coupled to the piston 30 within the liner 20 and to a crankshaft 36 within the crankcase 22. The cylinder head 26 includes an intake port 38 for receiving air or a mixture of fuel and air and an exhaust port 40 for discharging exhaust from the engine 10. An intake valve 42 (e.g., a poppet valve), disposed within the cylinder head 26 and the intake port 38, opens and closes to regulate the intake of air or the mixture of fuel and air into the engine 10 into a portion 44 of the cavity 32 above the piston 30. An exhaust valve 46, disposed within the exhaust port 40, opens and closes to regulate discharge of the exhaust from the engine 10. Both the intake port 38 and the exhaust port 40 may include a valve guide that is press-fit into the ports 38, 40. The valve guide may facilitate movement of the intake and exhaust valves 42 and 46, respectively. In certain embodiments (e.g., spark-ignition engine), a spark plug 48 extends through a portion of the cylinder head 26 and interfaces with the portion 44 of the cavity 32 where combustion occurs. In some embodiments (e.g., compression-ignition engine), the spark plug 48 is absent (or is replaced with a glow plug) and ignition occurs primarily due to compression of the mixture of air and fuel.

Opening of the intake valve 42 enables a mixture of fuel and air to enter the portion 44 of the cavity 32 above the piston 30 as indicated by arrow 52. With both the intake valve 42 and the exhaust valve 46 closed and the piston 30 near top dead center (TDC) (i.e., position of piston 30 furthest away from the crankshaft 36, e.g., near the top end 28 of the liner 20 or the cylinder 18), combustion of the mixture of air and fuel occurs due to spark ignition (in other embodiments due to compression ignition). Hot combustion gases expand and exert a pressure against the piston 30 that linearly moves the position of the piston 30 from a top portion (e.g., at TDC) to a bottom portion of the cylinder liner 20 (e.g., at bottom dead center (BDC) in direction 12, which is the position of the piston 30 closest to the crankshaft 36, e.g., near the bottom end 24 of the liner 20 or the cylinder 18) during an expansion stroke. The piston 30 converts the pressure exerted by the combustion gases (and the piston's linear motion) into a rotating motion (e.g., via the connecting rod 34 and the crank shaft 36 coupled to the piston 30) that drives one or more loads (e.g., electrical generator). During the exhaust stroke, the piston 30 returns from BDC to TDC, while the exhaust valve 46 is open to enable exhaust to exit the engine 10 via the exhaust port 40, as indicated by arrow 54.

The exhaust exiting through the exhaust port 40 may be at a temperature between approximately 400° C. (752° F.) and approximately 1500° C. (2732° F.). Therefore, the exhaust valve 46 has a significant heat load and may be subject to thermal stress and overheating. For example, in certain embodiments, the exhaust valve 46 may reach a temperature of up to 900° C. (1652° F.). As discussed above, while sodium may be used to cool exhaust valves, such as exhaust valve 46, it may be desirable to use less reactive materials to cool the exhaust valve. As such, undesirable effects associated with the disposal of sodium cooled exhaust valves may be mitigated.

Figure 2:
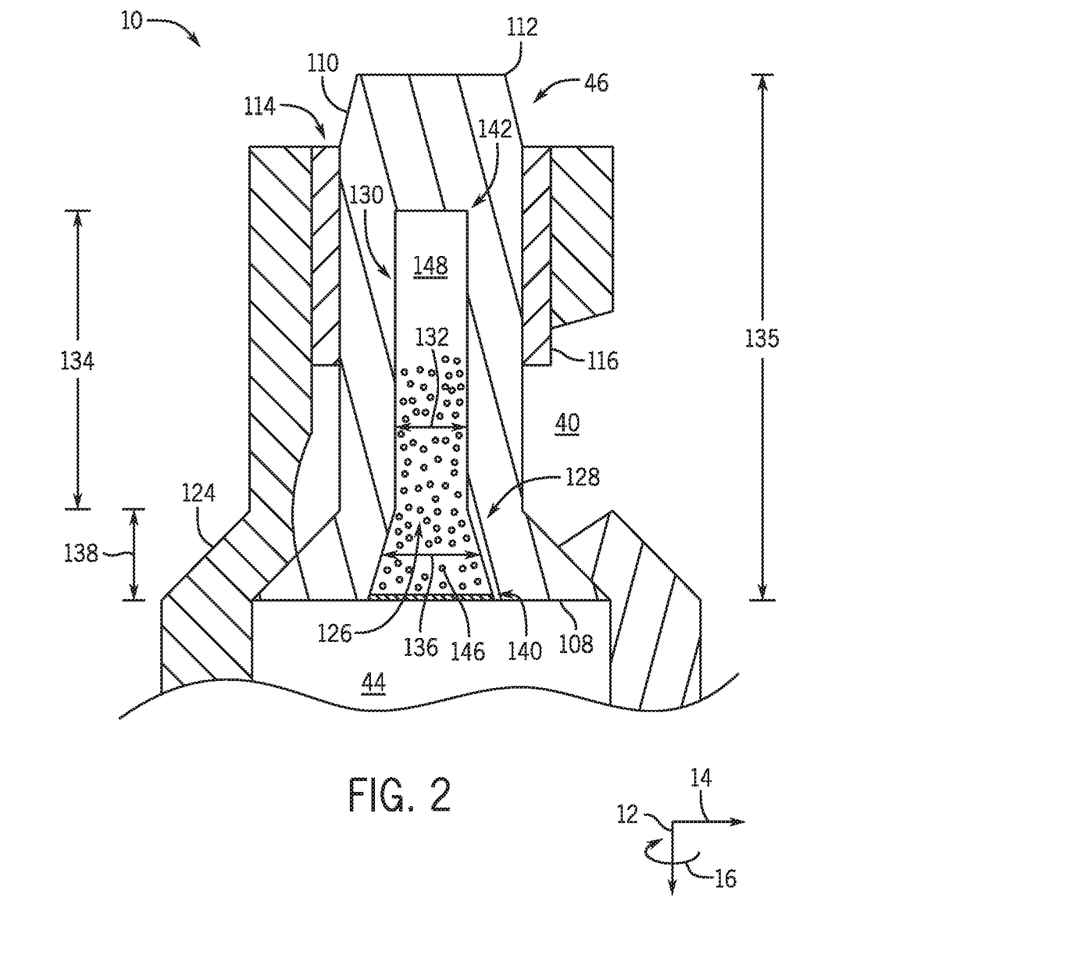
FIG. 2 is a cross-sectional view of an embodiment of a valve disposed within a cylinder head that may be used with the reciprocating engine of FIG. 1, wherein the valve includes a cavity that retains a cooling material, and the cooling material is a metal alloy.

FIG. 2 is a cross-sectional view of an embodiment of the exhaust valve 46 disposed within the cylinder head 26 of the engine 10 to enable flow of exhaust gases out of the portion 44 (e.g., the combustion chamber). The exhaust valve 46 may include metallic cooling materials having desirable chemical properties to facilitate cooling the exhaust valve 46 during operation of the engine 10. While the present embodiments are discussed in the context of the exhaust valve 46, the exhaust valve 46 may also be any other poppet valve such as the intake valve 42. The exhaust valve 46 may also have the axial axis or direction 12, the radial axis or direction 14, and the circumferential axis or direction 16.

In the illustrated embodiment, the exhaust valve 46 includes a head 108 and a stem 110 (e.g., a shaft). In certain embodiments, a stem terminus 112 is tapered. In other embodiments, the stem terminus 112 is non-tapered. The stem 110 is inserted into a bore 114 of the cylinder head 26 that is coupled to the exhaust port 40. In certain embodiments, the bore 114 includes a valve guide 116 (e.g., an annular valve guide). The exhaust valve 46 reciprocates within the bore 114 to control a flow of the exhaust gas from the combustion chamber (e.g., the portion 44) of the engine. As should be noted, a lubricant (e.g., oil) is generally provided to reduce friction between a surface of the bore 114 and the stem 110. In operation, the head 108 may be nested within a valve seat 124 (e.g., and annular valve seat) adjacent to the portion 44. Therefore, fluid flow to and from the combustion chamber (e.g., the portion 44) may be blocked at certain times during operation of the engine 10. For example, during influx and combustion of the fuel and air in the combustion chamber, the exhaust valve 46 may seal the bore 114 to block premature release of the fuel and air from the combustion chamber.

As discussed above, the exhaust valve 46 may be exposed to the operational conditions of the combustion chamber (e.g., high temperatures, exhaust gases, carbon particulates, etc.), in particular the head 108 and at least a portion of the stem 110 proximal to the head 108. Accordingly, the exhaust valve 46 includes a cavity 126 axially extending (e.g., along the axis 12) through the head 108 and into at least a portion of the stem 110. The cavity 126 includes a portion 128 disposed within the head 108 and a portion 130 disposed within the stem 110. The portion 130 has a diameter 132 and a length 134. The length 134 may be less than or approximately equal to a total length 135 of the exhaust valve 46 (e.g., from the head 108 to the stem terminus 112). For example, the length 134 of the portion 130 may be between approximately 1% to approximately 50% less than the length 135 of the exhaust valve 46, such as 1%, 5%, 10%, 15%, 20%, 30%, 40%, or 50% less than the length 135.

The portion 128 has a diameter 136 that is larger than the diameter 132 of the portion 130. In certain embodiments, the portion 128 has a decreasing diameter 136 in the longitudinal direction 12 from first end 140 to portion 130, such that the portion 128 is tapered (e.g., curved annular shape or conical shape) towards the portion 130. That is, the diameter 136 at the junction of the portion 128 and the portion 130 is substantially equal to the diameter 132. The portion 128 has a length 138 that is between approximately 20% and approximately 50% less than the length 134 of the portion 130. The length 138 of the portion 128 may depend on an overall size of the head 108. First and second ends 140 and 142 of the cavity 126 are each sealed, such that the cavity 126 retains a cooling material 146. As discussed in detail below, the cooling material 146 facilitates heat transfer from the head 108 of the exhaust valve 46 to the stem 110 during operation of the engine 10, and thereby enables cooling of the head 108.

In certain embodiments, the cooling material 146 may be a solid-to-liquid-phase heat transfer material. That is, the cooling material 146 may include materials that are in a solid phase at room temperature (e.g., 25° C./77° F.) and melt at the operational conditions of the engine 10. For example, the cooling material 146 may have a melting point equal to or greater than approximately 90° C. (212° F.). For example, the cooling material 146 may have a melting point between approximately 90° C. (196° F.) and approximately 250° C. (482° F.) such as between approximately 100° C. (212° F.) and approximately 225° C. (437° F.), between approximately 150° C. (302° F.) and approximately 200° C. (392° F.), or any other suitable melting point or range that enables the cooling material 146 to be in the liquid phase during operation of the engine 10. In addition, the cooling material 146 may also have a boiling point greater than 1000° C. (1832° F.) and a thermal conductivity greater than 25 watt per meter per degrees Celsius (W/m $^{-\circ}$ C.) at 25° C. Non-limiting examples of cooling materials that may be used to facilitate heat transfer between the head 108 and the stem 110 of the exhaust valve 46 include metal alloys such as lead-tin alloys (e.g., lead-tin solder), silver alloys (e.g., silver solder), indium alloys, antimony alloys, derivatives thereof, or any other suitable lead or lead-free metal alloy. As should be noted, the cooling material 146 is substantially free of elemental sodium.

The solder metal alloys have cooling properties similar to sodium metal (elemental sodium). However, the solder metal alloys have more desirable chemical properties. For example, the chemical reactivity of solder metal alloys is substantially less than the chemical reactivity of sodium metal. As such, by incorporating the solder metal alloys into the exhaust valve 46, disadvantages associated with the disposal of sodium-filled exhaust valves may be mitigated. In addition, disposal costs for metal alloy cooled exhaust valves may be reduced due, in part, to a decrease in processing and handling associated with more sodium-filled exhaust valves. As should be noted, any other suitable non-elemental metal heat transfer materials may also be used.

During operation of the engine 10, the cooling material 146 may absorb heat generated in the combustion chamber (e.g., the portion 44) and/or from the exhaust gases. Therefore, the heat melts the cooling material 146 into a liquid form. The reciprocating, translational motion, of the exhaust valve 46 enables the molten cooling material 146 (e.g., liquid metal cooling material 146) to move up and down the cavity 126. That is, the reciprocation of the exhaust valve 46 creates a "cocktail shaker" effect. As such the molten cooling material 146 flows from the hot head portion 128 to the cooler stem portion 130. Accordingly, the cooling material 146 transfers heat from the head 108 to the stem 110, which results in cooling of the head 108. Therefore, thermal stress, valve distortion, and valve overheating may be mitigated and engine reliability may be increased. To facilitate flow of the cooling material 146 from the head 108 to the stem 110, the cavity 126 may be partially filled with the cooling material 146 such that a gap 148 may be formed between the molten cooling material 146 and the ends 140, 142. For example, the cooling material 146 may fill between approximately 30% and approximately 90% of the cavity 126, such as less than or equal to approximately 30%, 40%, 50%, 60%, 70%, 80%, or 90%. In certain embodiments, the cooling material 146 may only fill the head portion 128 or the stem portion 130 of the cavity 126. In this way, the molten cooling material 146 may flow in and out of the head portion 128 and the stem portion 130 to enable cooling of the exhaust valve 46 (e.g., by directing heat from the head portion 128 to the stem portion 130 and guide 116 where there is greater cooling).

Figure 3:
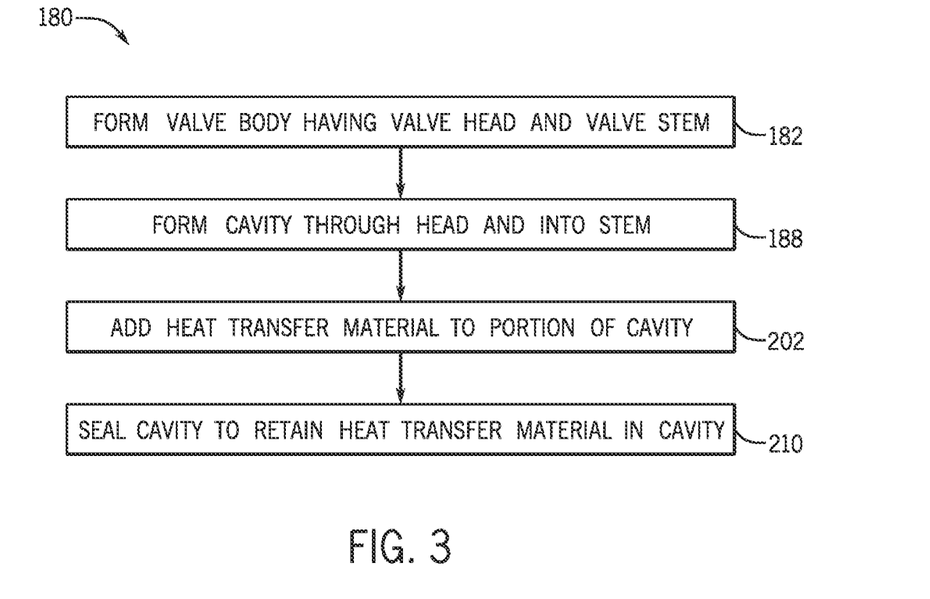
FIG. 3 is a flow diagram of an embodiment of a method that may be used to manufacture the valve of FIG. 2.

Present embodiments of the disclosure also include a method of manufacturing the exhaust valve 46. FIG. 3 is an embodiment of a method 180 that may be used to manufacture the exhaust valve 46. The exhaust valve 46, which may also be used as an intake valve, may be manufactured via a variety of manufacturing techniques (e.g., casting, extrusion, machining/milling), additive manufacturing (e.g., 3D printing), or any other suitable manufacturing technique. To facilitate discussion of aspects of the method 180, reference is made to corresponding structures resulting from the acts of the method 180 in FIGS. 4-7.

Figure 4:
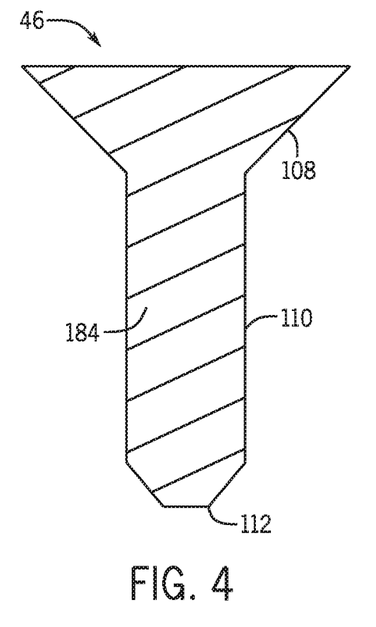
FIG. 4 is a diagrammatical illustration of an embodiment of a portion of the valve of FIG. 2 resulting from a step of the method of FIG. 3.

The method 180 includes generating a valve body having the valve head 108 and the valve stem 110 (block 182). For example, with reference to FIG. 4, the configuration of the acts of block 182 is illustrated. The diagram in FIG. 4 illustrates a cross-sectional view of a valve body 184 having the valve head 108 and the stem 110. In certain embodiments, the valve body 184 may be cast or extruded from a thermally conductive valve material such as, but not limited to, copper, aluminum, and their respective alloys, among others. As should be noted, the thermally conductive valve material is different from the metal alloys used for the cooling material 146. The valve body 184 may be machined or milled to form the valve head 108 and the stem 110. In some embodiments, the valve body 184 may include a combination of the thermally conductive valve material and a wear-resistant material such as, but not limited to steel, cast iron, and derivatives thereof.

Figure 5:
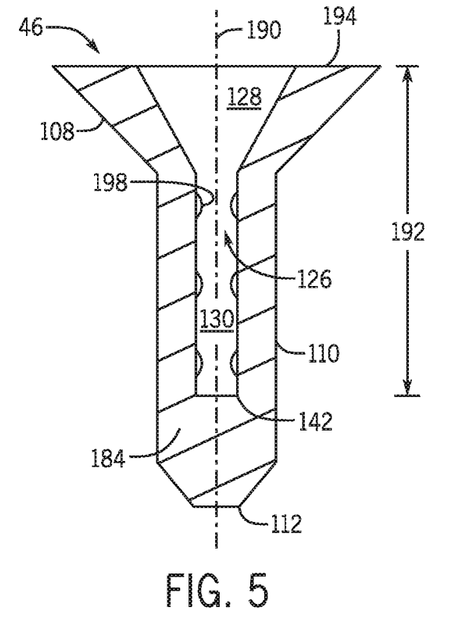
FIG. 5 is a diagrammatical illustration of an embodiment of the valve of FIG. 2 resulting from various steps of the method of FIG. 3, wherein the valve includes a cavity.

Returning to the method 180 of FIG. 3, following formation of the valve body 184, a portion of the thermally conductive valve material may be removed to form the cavity 126 (block 188). For example, as illustrated in FIG. 5, the thermally conductive valve material is removed from a portion of the head 108 and the stem 110 along a centerline 190 to form the cavity 126. For example, the thermally conductive valve material may be removed using machining or milling techniques to form the cavity 126. The cavity 126 may terminate (e.g., at the end 142) a distance 192 from a valve proximal end 194. The distance 192 may be equal to a sum of the lengths 134, 138 of the portions 128, 130. For example the distance 192 may be between approximately 50% to approximately 99% of the total length 135 of the valve body 184, such as between approximately 55% and approximately 95%, between approximately 60% and approximately 90%, between approximately 65% to 85%, or between approximately 70% and approximately 80%. In certain embodiments, the cavity 126 may include ridges or protrusions 198 (e.g., annular protrusions and/or circumferentially spaced protrusions at different axial positions) that facilitate mixing of the cooling material 146 within the cavity 126 during operation of the engine 10. Mixing of the cooling material 146 within the cavity 126 may facilitate dissipation of the heat absorbed by the cooling material 146, and thereby increase the efficiency of heat transfer from the cooling material 146 to the stem 110. As should be noted, in certain embodiments, the valve body 184 may be cast (e.g., molded) to include the cavity 126. That is, the portion of the thermally conductive valve material may not need to be removed because the cavity 126 is formed during formation (e.g., casting) of the valve body 184.

Figure 6:
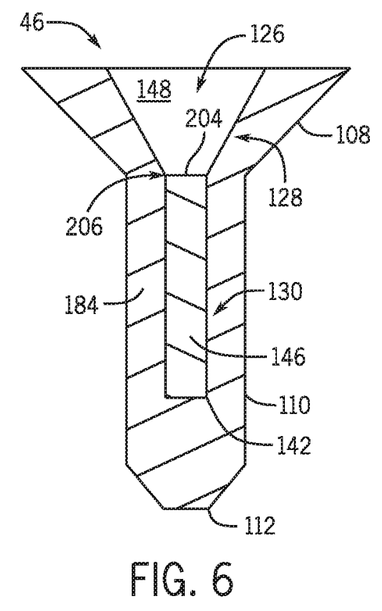
FIG. 6 is a diagrammatical illustration of the valve of FIG. 2 resulting from various steps of the method of FIG. 3, wherein the valve includes the metal alloy within the cavity.

Returning again to the method 180 of FIG. 3, upon removing a portion of the thermally conductive valve material in accordance with block 188, the method 180 includes adding the cooling material 146 to the cavity 126 (block 202). Non-limiting examples of the cooling material 146 include metal alloys such as tin (Sn) solder derivatives, and silver (Ag) solder derivatives, and combinations thereof. For example, the metal alloys may include 60/40 tin (Sn)/lead (Pb), 63/37 Sn/Pb, $Sn_{50}Zn_{49}Cu_1$ (tin/zinc/copper), $Sn_{96.5}Ag_{3.0}Cu_{0.5}$ (tin/silver/copper), $Sn_{95.8}Ag_{3.5}Cu_{0.7}$, $In_{90}Ag_{10}$ (indium/silver), $In_{50}Sn_{50}$ or any other suitable metal alloy. Referring to FIG. 6, the cooling material 146 is deposited within the cavity 126, such that a top surface 204 of the cooling material 146 is at a junction 206 between the head portion 128 and the stem portion 130. The gap 148 is formed within the head portion 128 of the cavity 126, and thereby the cooling material 146 may move within the cavity 126 during operation of the engine 10. As such, the cooling material 146 may enable heat transfer from the head 108 to the stem 110 of the exhaust valve 46. In certain embodiments, the cooling material 146 is melted prior to placement in the cavity 126 (e.g., pouring the material 146 in liquid form into the cavity 126). This may facilitate adding the cooling material 146 to the cavity 126. In other embodiments, the cooling material 146 may be a solid structure sized to fit within the stem portion 130. The solid structure may be inserted and press-fit into the stem portion 130 of the cavity 126. During operation of the engine 10, the solid structure may melt, and thereby enable heat transfer as discussed above.

Figure 7:
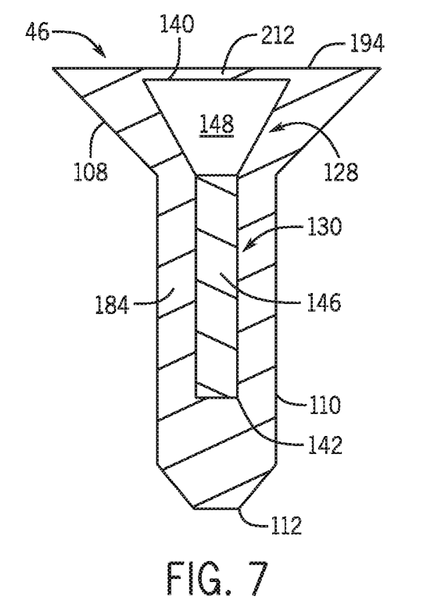
FIG. 7 is a diagrammatical illustration of the valve of FIG. 2 resulting from various steps of the method of FIG. 3, wherein the valve includes a seal that retains the metal alloy within the cavity.

Returning to the method 180 of FIG. 3, once the cooling material 146 has been added to the cavity 126 in accordance with block 202, the cavity is sealed to retain the cooling material 46 within the cavity 126 (block 210) during operation of the engine 10. As illustrated in FIG. 7, a seal 212 is disposed on the valve proximal end 194 directly over the cavity 128. In certain embodiments, the seal 212 may be welded, for example friction welded or electron beam welded, onto the valve proximal end 194. However, any other coupling technique may be utilized to join the seal 212 to the valve proximal end 194 such as brazing and soldering. The seal 212 may also be a thermally conductive material similar to the thermally conductive material used to manufacture the exhaust valve 46 according to block 182.

As discussed above, certain embodiments of the exhaust valve 46 include incorporating a solder metal alloy (e.g., the cooling material 146) into the cavity 126 to facilitate cooling of the exhaust valve 46. Similar to the sodium metal in current exhaust valves, the solder metal alloys (e.g., the cooling material 146) may transfer heat from the valve head 108 to the stem 110 to enable cooling of the head 108 during operation of the engine 10. By using the solder metal alloy, rather than sodium metal, problems associated with the disposal and handling of sodium-filled exhaust valves may be mitigated. For example, due to the more less-reactive chemical properties of the metal alloys, the disposal processing and handling steps associated with disposal of sodium metal may be eliminated. As such, the overall disposal costs for metal alloy-filled exhaust valves, such as the exhaust valve 46, may be reduced. Additionally, because the disposal costs for metal alloy-filled exhaust valves are decreased, engine repair costs may also be decreased.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method, comprising:
   forming a valve base comprising a first thermally conductive material, a valve head having a first end, and a valve stem having a second end, wherein the second end is substantially opposite from the first end;
   forming a cavity within the valve base, wherein the cavity is aligned with a centerline axis of the valve base, and wherein the cavity comprises a first region disposed within the valve head and a second region disposed within the valve stem, and wherein the first region and the second region are fluidly coupled; and
   depositing a second thermally conductive material into at least a portion of the cavity, wherein the second thermally conductive material is different from the first thermally conductive material, and wherein the second thermally conductive material comprises a metal alloy, and wherein the metal alloy comprises a thermal conductivity greater than 25 watts per meter per degrees Celsius (W/m $^{-\circ}$ C.) at 25 degrees Celsius ° C.

2. The method of claim 1, comprising sealing the cavity by disposing a seal over the first region of the cavity, wherein the seal is flush with the first end of the valve base.

3. The method of claim 1, wherein the metal alloy comprises a melting point between approximately 90 degrees Celsius (° C.) and approximately 250° C.

4. The method of claim 1, wherein the metal alloy comprises a lead solder material, a silver solder material, or a tin solder material.

5. A valve for a cylinder head of a reciprocating engine, comprising:
   a first valve end and a second valve end;
   a valve head having the first valve end;
   a stem extending from the valve head and having a first length, wherein the stem has the second valve end and the second valve end is substantially opposite the first valve end, wherein the first valve end, the valve head, and the stem comprise a first thermally conductive material;
   a cavity aligned with a centerline axis of the valve, wherein the cavity comprises a first region disposed within the valve head and a second region disposed within the stem, and the second region has a second length shorter than the first length along the centerline axis; and
   a second thermally conductive material different from the first thermally conductive material disposed within the cavity, wherein the second thermally conductive material comprises a metal alloy that is configured to transfer heat from the valve head to the valve stem, and wherein the metal alloy comprises a thermal conductivity greater than 25 watts per meter per degrees Celsius (W/m $^{-\circ}$ C.) at 25 degrees Celsius ° C.

6. The valve of claim 5, wherein the metal alloy comprises a melting point between approximately 90 degrees Celsius (° C.) and approximately 250° C.

7. The valve of claim 5, wherein the metal alloy comprises a lead-free solder material.

8. The valve of claim 5, wherein the metal alloy comprises a lead-tin solder material.

9. The valve of claim 5, wherein the valve is an exhaust valve.

10. The valve of claim 5, wherein the first region comprises a first diameter and a second diameter and the second region comprises a third diameter, wherein the first diameter is larger than the second diameter and the third diameter is substantially equal to the second diameter.

11. The valve of claim 10, wherein the valve comprises a seal disposed over the first region of the cavity, wherein the seal is configured to plug the cavity such that the metal alloy is retained within the cavity.

12. The valve of claim 5, wherein the cavity comprises a hollow passage between a top surface of the metal alloy and a terminus of the cavity, wherein the hollow passage enables a flow of the metal alloy between the first region and the second region.

13. A valve, comprising:
   a valve head having a first valve end;
   a stem extending from the valve head and having a second valve end and comprising a first length, wherein the second valve end is substantially opposite the first valve end, wherein the valve head and the stem comprise a first thermally conductive material;
   a cavity aligned with a centerline axis of the valve, wherein the cavity comprises a first region disposed within the valve head and a second region disposed within the stem, wherein the first region and the second region form a continuous passage, and wherein the second region has a second length shorter than the first length along the centerline;
   a plurality of protrusions disposed within the second region of the cavity; and
   a second thermally conductive material different from the first thermally conductive material disposed within a portion of the first region, the second region, or a combination thereof, wherein the second thermally conductive material comprises a metal alloy comprising a melting temperature less than 250 degrees Celsius (° C.), and wherein the metal alloy comprises a thermal conductivity greater than 25 watts per meter per degrees Celsius (W/m $^{-\circ}$ C.) at 25 degrees Celsius ° C.

14. The valve of claim 13, comprising a seal disposed over the first region of the cavity, wherein the seal plugs the cavity such that the metal alloy is retained within the cavity.

15. The valve of claim 13, wherein the cavity comprises a gap between a surface of the metal alloy and a terminus of the cavity, wherein the gap is configured to enable a flow of the metal alloy between the first region and the second region.

16. The valve of claim 13, wherein the melting temperature is between approximately 90 degrees Celsius (° C.) and approximately 200° C.

17. The valve of claim 13, wherein the metal alloy comprises a lead-free solder material.

18. The valve of claim 13, wherein the valve comprises an exhaust valve for a reciprocating engine.

* * * * *